US012242557B1

(12) United States Patent
Gorde et al.

(10) Patent No.: US 12,242,557 B1
(45) Date of Patent: Mar. 4, 2025

(54) SYSTEMS FOR DETERMINING ANOMALOUS INTERACTIONS BASED ON CHARACTERISTIC TYPES

(71) Applicant: AMAZON TECHNOLOGIES, INC., Seattle, WA (US)

(72) Inventors: Vaibhav Gorde, Seattle, WA (US); Sarthak Ghosh, Seattle, WA (US); Yan Zhang, Bellevue, WA (US); Radu Drossu, Seattle, WA (US); Asaph Engel, San Diego, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 16 days.

(21) Appl. No.: 18/066,854

(22) Filed: Dec. 15, 2022

(51) Int. Cl.
*G06F 16/9537* (2019.01)
*G06F 16/951* (2019.01)
*G06F 16/9535* (2019.01)
*G06F 16/9536* (2019.01)
*G06F 16/9538* (2019.01)

(52) U.S. Cl.
CPC ........ *G06F 16/9537* (2019.01); *G06F 16/951* (2019.01); *G06F 16/9535* (2019.01); *G06F 16/9536* (2019.01); *G06F 16/9538* (2019.01)

(58) Field of Classification Search
CPC ............. G06F 16/9537; G06F 16/9535; G06F 16/9536; G06F 16/9538; G06F 16/951
See application file for complete search history.

(56) References Cited

U.S. PATENT DOCUMENTS

| 10,666,666 | B1* | 5/2020 | Saurabh | H04L 63/1425 |
| 2010/0235489 | A1* | 9/2010 | Cogan | G06F 16/337 709/224 |
| 2012/0041817 | A1* | 2/2012 | Priyadarshan | G06Q 30/0244 705/14.43 |
| 2019/0138643 | A1* | 5/2019 | Saini | G06F 16/2474 |

(Continued)

OTHER PUBLICATIONS

"2019 MRC Global Fraud Survey Results", Merchant Risk Council; CyberSource, 3 pages. Retrieved from the Internet: URL: https://merchantriskcouncil.org/resource-center/surveys/2019/2019-mrc-global-fraud-survey-results.

(Continued)

*Primary Examiner* — Hosain T Alam
*Assistant Examiner* — Lin Lin M Htay
(74) *Attorney, Agent, or Firm* — Lindauer Law, PLLC

(57) ABSTRACT

Anomalous interactions with a website or other system may be detected based on the types of characteristics associated with previous anomalous interactions, independent of the values associated with those characteristics. Historical data is used to determine characteristics of interactions, each characteristic having a type and a value. For historical interactions in which a set of characteristic values are associated with a potentially anomalous interaction, the characteristic types are analyzed in subsequent interactions. If values for those characteristic types occur at a frequency greater than a threshold frequency for a set of subsequent interactions, this may indicate that the interactions are anomalous. Use of the characteristic types for this purpose, rather than historical characteristic values, enables anomalous interactions to be detected independent of the characteristic values associated with the interactions.

20 Claims, 7 Drawing Sheets

(56) References Cited

U.S. PATENT DOCUMENTS

2020/0167786 A1* 5/2020 Kursun .................. H04L 63/08

OTHER PUBLICATIONS

Akoglu, et al., "Oddball: Spotting Anomalies in Weighted Graphs", Advances in Knowledge Discovery and Data Mining, 2010, 11 pages. Retrieved from the Internet: URL: https://www.researchgate.net/publication/220894884_OddBall_Spotting_Anomalies_in_Weighted_Graphs.

Bolton, et al., "Statistical Fraud Detection: a Review", Statistical Science, vol. 17, No. 3., 2002, pp. 235-255. Retrieved from the Internet: URL: file:///C:/Users/anna.goforth/Downloads/1042727940.pdf.

Charikar, et al., "Finding Frequent Items in Data Streams", 11 pages. Retrieved from the Internet: URL: https://www.cs.princeton.edu/courses/archive/spring04/cos598B/bib/CharikarCF.pdf.

Ghosh, et al., "Credit Card Fraud Detection with a Neural-Network", Proceedings of the Twenty-Seventh Annual Hawaii International Conference on System Sciences, 1994, IEEE, pp. 621-630. IEEE, 1994. Retrieved from the Internet: URL: http://bit.csc.lsu.edu/~jianhua/quang.pdf.

Gorde, et al., "DARTS: Detection of Anomalies in Real-Time Text Stream (DARTS) for Risk Management", 8th Amazon Machine Learning Conference (AMLC 2020), pp. 1-9.

Guha, et al., "Robust Random Cut Forest Based Anomaly Detection on Streams", International Conference on Machine Learning, pp. 10 pages, 2016. Retrieved from the Internet: URL: http://proceedings.mlr.press/v48/guha16.pdf.

Hochreiter, et al., "Long Short-Term Memory", Neural Computation, 9(8):1735-1780, 1997. Retrieved from the Internet: URL: http://www.bioinf.jku.at/publications/older/2604.pdf.

Hooi, et al., "FRAUDAR: Bounding Graph Fraud in the Face of Camouflage", Proceedings of the KDD 2016, 10 pages. Retrieved from the Internet: URL: https://www.kdd.org/kdd2016/papers/files/rfp0110-hooiA.pdf.

Lee, et al., "INFOSHIELD: Generalizable Information-Theoretic Human-Trafficking Detection". In 2021 IEEE 37th International Conference on Data Engineering (ICDE), 12 pages. Retrieved from the Internet: URL: https://www.semanticscholar.org/paper/INFOSHIELD%3A-Generalizable-Information-Theoretic-Lee-Vajiac/742d3c84efd9457d826d5ea22c143e31a8eb4080.

Liu, et al., "Isolation Forest", 2008 Eighth IEEE International Conference on Data Mining, pp. 413-422. IEEE, 2008. Retrieved from the Internet: URL: https://www.researchgate.net/publication/224384174_Isolation_Forest.

Metwally, et al., "An Integrated Efficient Solution for Computing Frequent and Top-k Elements in Data Streams", ACM Transactions on Database Systems, vol. 31, No. 3, Sep. 2006, pp. 1095-1133.

Padmanabhan, et al., "CLUSTERCATCH: Spotting groups of suspicious nodes in an Amazon customer graph", 2018, AMLC, Seattle, USA, pp. 1-10.

Robertson, et al., "Okapi at TREC", Text Retrieval Conference, pp. 21-30, 1993. Retrieved from the Internet: URL: https://trec.nist.gov/pubs/trec1/t1_proceedings.html.

Schubert, et al., "DBSCAN Revisited, Revisited: Why and How You Should (Still) Use DBSCAN", ACM Transactions on Database Systems, vol. 42, No. 3, Jul. 2017, pp. 1-21. Retrieved from the Internet: URL: http://www.ccs.neu.edu/vip/teach/DMcourse/2_cluster_EM_mixt/notes_slides/revisitofrevisitDBSCAN.pdf.

Wang, et al., "Predictive Modeling for Early MO Detection", 2018 AMLC Seattle, US, pp. 1-7.

Winters, Peter R., "Forecasting Sales by Exponentially Weighted Moving Averages", Management Science 6(3), 1960, pp. 324-342. URL: https://doi.org/10.1287/mnsc.6.3.324.

* cited by examiner

SYSTEMS FOR DETERMINING ANOMALOUS INTERACTIONS BASED ON CHARACTERISTIC TYPES

BACKGROUND

When a user interacts with a website or other type of system, a large number of characteristics of the interaction may be determined, such as an internet protocol (IP) address, hardware or software components of a device, user-provided information such as an e-mail address, and so forth. When a large number of user interactions having similar values for a set of characteristics occur in a short timeframe, this may be indicative of anomalous or malicious behavior. Systems for detecting anomalous interactions are typically limited to use of historical data to identify current interactions having values for characteristics that match previous anomalous interactions.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
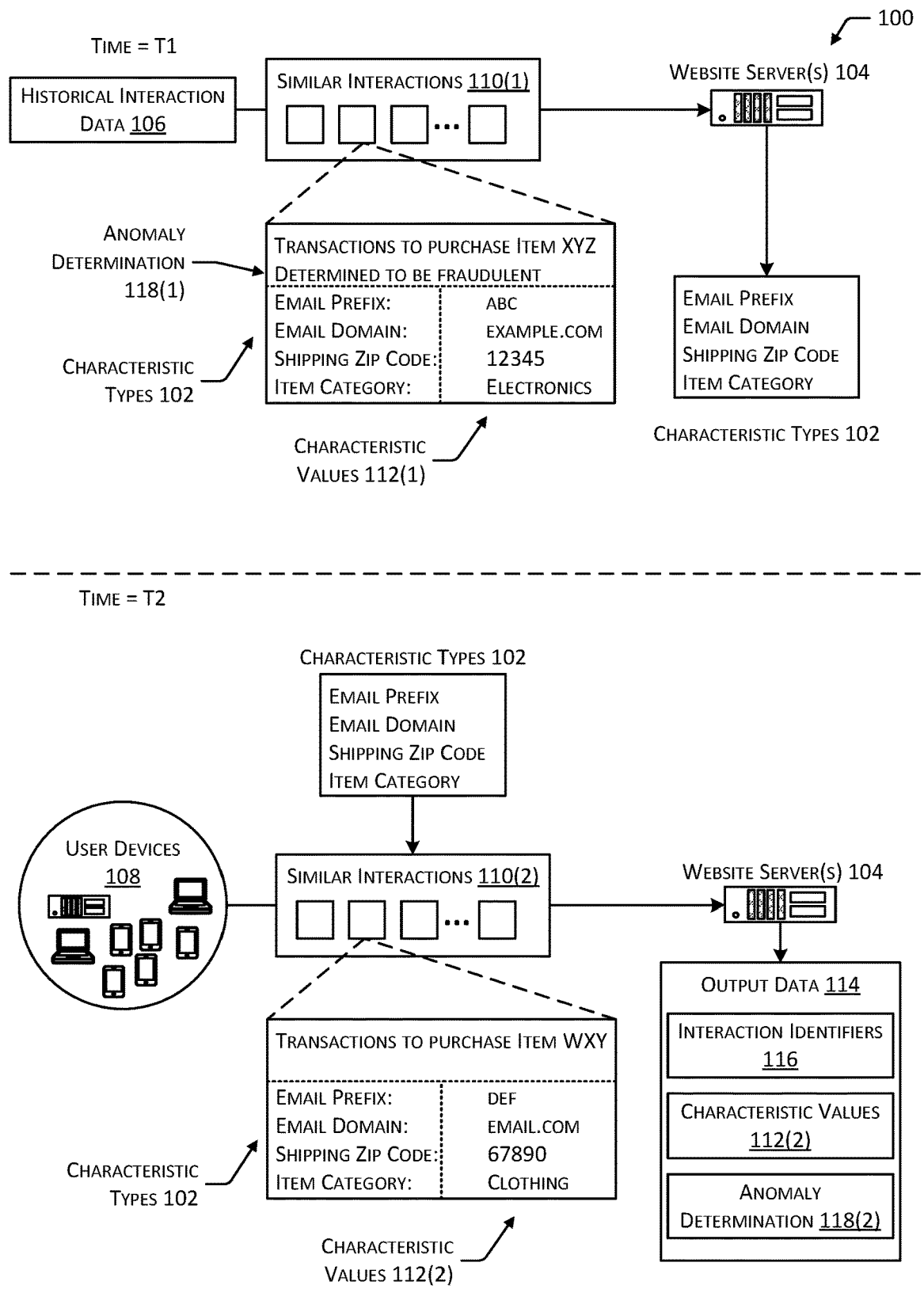
FIG. 1 is a diagram depicting an implementation of a process for determining characteristic types associated with potentially anomalous historical interactions and using the characteristic types to determine potentially anomalous future interactions.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

When a user interacts with a website or other type of system, numerous characteristics associated with the interaction may be determined. For example, hardware or software components of the device used to access a website may be identified, such as a particular browser application. An Internet Protocol (IP) address or other location data associated with the device may be determined. In some cases, a user may provide input as part of an interaction, such as an e-mail address or other geographic or demographic information associated with a user or user account. Additionally, in cases where a user is interacting with an online store to view or purchase items, or to sell items to other users, characteristics of the item(s), a shipping address, payment information (e.g., bank or credit instrument information), account age, or other account information may be determined.

The characteristics associated with an interaction may be used to determine anomalous interactions, such as malicious actions (e.g., fraud or abuse), a malfunctioning service, or other irregular attempts to access a website or other system, which in some cases may require review or intervention. For example, if a large number of transactions, such as orders to purchase an item from an online store, occur during a short time period, and each of these transactions is associated with a particular set of characteristics, such as the same e-mail address, geographic location, and type of item, this may represent a significant deviation from the typical interactions associated with a website. A potentially anomalous set of purchases, represented by an atypical number of interactions within a short time frame that have the same or similar values for a set of characteristics, may be addressed by preventing shipment of items without further verification. As another example, sellers of items using an online store may send communications to a large number of customers, and such communications may be associated with characteristics such as a sender e-mail address, subject line, e-mail text, status of the account associated with the seller, amount of revenue associated with the seller, and so forth. Detection of a potentially anomalous set of communications (e.g., a large number of communications within a short timeframe that have the same or similar values for a set of characteristics) may be addressed by preventing sending of the communications to customers without further verification. As yet another example, an application submitted by a user for one or more types of benefits associated with a business or other entity may be associated with characteristics such as a name, address, other geographic or demographic information associated with the user, text that responds to application questions, and so forth. Potentially anomalous interactions, such as receipt of multiple applications in a short timeframe that include identical or similar responses to the same questions, may be addressed by denying the applications until further verification is performed.

Conventional systems for determining anomalous interactions use historical data to determine a pattern of values for characteristics that are associated with anomalous interactions. For example, if previous fraudulent transactions for an online store originated from a specific e-mail domain, included certain characters in an e-mail address, were associated with an IP address corresponding to a particular geographic location, and requested that items be shipped to a certain zip code, future transactions that use the same e-mail domain, geographic location, and shipping location may be identified as potentially fraudulent. In some cases, various transforms may be used on these values to enable patterns of similar values for characteristics to be identified, such as small changes to e-mail addresses or shipping addresses. However, existing systems that rely on historical values for characteristics of interactions have limited effectiveness when attempting to detect types of anomalous interactions that have not occurred previously and do not have values for characteristics that match historical values. Existing systems may also have reduced effectiveness when a previous source of anomalous interactions changes one or more values associated with a characteristic of the interaction to circumvent detection.

Described in this disclosure are techniques for enabling anomalous interactions to be determined based on patterns in characteristics of the interactions, even in cases where historical data does not necessarily indicate previous interactions that include the values associated with the anomalous interactions. Historical data may represent previous interactions with a website or other type of system. Each interaction represented by the historical data is associated with a corresponding set of characteristics. Each characteristic comprises a characteristic type and a characteristic value. For example, for a previous interaction associated with the e-mail address "abc@example.com", the characteristic type may be "e-mail domain" while the value for that characteristic type may be "example.com". Similarly, another characteristic type may be "email prefix", while the value for that characteristic type may be "abc".

The historical data may be analyzed to determine a subset of interactions having one or more characteristic values that occurred at a frequency greater than a threshold frequency, or if the frequency at which the characteristic values occurs changes more than a threshold amount during a period of time. For example, if a large number of previous interactions within a short timeframe were associated with the e-mail address "abc@example.com" and a shipping zip code of "12345", these interactions may potentially have been anomalous. In some implementations, the historical data may include an indication of a type of anomalous interaction that was determined for a set of interactions. Conventional systems would typically determine a set of values based on the historical data and would use these values to analyze future interactions for potential anomalous interactions. For example, future interactions associated with the e-mail address "abc@example.com" and a shipping zip code of "12345" may be determined as potentially anomalous. In contrast, in implementations described herein, the historical data is used to determine the characteristic types, rather than the values for the characteristics, and this pattern of characteristic types is used to analyze future interactions. For example, based on the historical data described previously, the combination of "e-mail domain" and "shipping zip code" may be determined as a set of characteristic types that may be useful for identifying future anomalous interactions. Subsequently, if a large number of subsequent interactions include identical or similar values for both the "email domain" and "shipping zip code" characteristic types, independent of the particular values associated with those characteristic types, this determination may be used to identify potentially anomalous interactions. Therefore, this pattern of characteristic types may be used to determine anomalous interactions even in cases where the particular values for those characteristics do not occur in historical data. Additionally, use of this pattern of characteristic types may continue to determine anomalous interactions even in cases where a potentially malicious actor changes one or more values associated with the characteristics.

Multiple patterns of characteristic types may be determined in this manner and used to detect potentially anomalous interactions. In some implementations, the particular sets of characteristic types that are used may be determined based on risk values associated with the sets of characteristic types. For example, after determining multiple sets of characteristic types for which identical or similar values occurred in historical interaction data, the interactions from which those characteristic types were determined may be analyzed to determine a risk associated with a particular anomaly. Continuing the example, if the historical interaction data includes a large number of interactions having identical or similar values for a set of characteristic types that were determined to be fraudulent interactions, the set of characteristic types may be associated with a high risk value for fraudulent transactions. Different sets of characteristic types may be associated with different risks for various types of anomalous interactions. For example, a set of characteristic types associated with a low risk value for fraudulent transactions may be associated with a high risk value for transactions associated with abuse. As such, the specific set of characteristic types that are selected for future use may be selected based on the types of anomalous interactions to be detected and the risk value associated with the sets of characteristic types for those types of anomalous interactions.

Implementations described herein may therefore enable anomalous interactions to be identified even in cases where the specific characteristic values of the interaction have not occurred previously, by analyzing a set of characteristic types to determine whether identical or similar values for those characteristic types occur with a frequency that is larger than an expected frequency. This technique enables malicious interactions or other types of anomalous interactions that have not previously been observed by a system to be detected and addressed, and enables changes in characteristics of an interaction by a potentially malicious actor to also be detected and addressed. Selection of sets of characteristic types having risk values specific to particular types of anomalous interactions may enable the techniques described herein to be customized to particular purposes, scaled, and so forth. Additionally, selective analysis of sets of characteristic types to detect particular types of anomalous interactions based on the effectiveness of those sets of characteristic types to determine the specified types of anomalous interactions in historical data enables anomalous interactions to be detected efficiently, while conserving computational resources. For example, a set of characteristic types may be used to analyze interaction data in response to a trigger, such as determining that a set of identical or similar values for those characteristic types has occurred more than a threshold number of times within a selected period of time, and determining that the particular set of characteristic types has not been recently used to analyze interaction data. Continuing the example, a determination may be made that output has not been determined using a first set of characteristic types within at least a threshold length of time, and output may be determined based on a second set of interactions in response to determining that output has not been determined using the first set of characteristics within at least the threshold length of time. As a result, techniques described herein may be scalable to accommodate large bodies of interaction data and may be performed rapidly, such as in real-time or near-real-time.

FIG. 1 is a diagram 100 depicting an implementation of a process for determining characteristic types 102 associated with potentially anomalous historical interactions and using the characteristic types 102 to determine potentially anomalous future interactions. An anomalous interaction may include any pattern of interactions (such as logins, orders for items, registrations of accounts, and so forth) having a rate of occurrence that deviates from an expected rate of occurrence (determined using historical data) by at least a threshold amount, that is unable to be attributed to factors expected to cause a change in a rate of occurrence, such as promotion of an item, seasonality, or the launch of a new product. For example, anomalous interactions may include interactions associated with a malicious actor (e.g., fraud or abuse), or interactions indicative of a service or other entity that is not functioning properly.

At a first time T1, one or more website servers 104 associated with a website or other type of system or interface may access historical interaction data 106, which may represent user interactions between a user device 108 and the website or other system during a previous time period. For example, the website server(s) 104 may include one or more computing devices associated with a website for an online store, and the historical interaction data 106 may include data that represents webpages accessed by user devices 108, items viewed, purchased, or returned by users, ratings or reviews provided by user devices 108, communications sent by user devices 108, or other user input, clickstream data, or data descriptive of input received from a user device 108 or sent to a user device 108 while accessing the website. While FIG. 1 depicts the website server(s) 104 as a server, in other implementations, any number and any type of computing devices including, without limitation, servers, personal computing devices, portable or wearable computing devices, vehicle-based computing devices, networked media devices, and so forth may be used.

The website server(s) 104 may determine a set of similar interactions 110(1) based on the historical interaction data 106. While FIG. 1 depicts a single set of similar interactions 110(1) for illustrative purposes, any number of sets of similar interactions 110(1) may be determined and used to determine a corresponding set of characteristic types 102 for use detecting potentially anomalous interactions. A set of interactions may be similar if each interaction in the set occurs within a threshold period of time, at least a threshold number of characteristic values 112(1) for the interactions match or are within a threshold similarity of one another, and the number of interactions in the set for the period of time (e.g., the rate of occurrence) exceeds a threshold rate of occurrence.

In some implementations, a set of similar interactions 110(1) may be determined using matrix factorization algorithms, such as a singular value decomposition (SVD) algorithm. For example, the features of an interaction may be represented in a matrix (M) in which each row corresponds to an interaction and each column represents a characteristic value 112 for the interaction. The matrix (M) may be truncated into sub-matrices. For example, if the matrix (M) has dimensions R×C, the matrix (M) may be divided into a number(S) of sub-matrices, such as a first sub-matrix (U) having dimensions R×S (with columns corresponding to the left singular vectors of matrix (M)), a second sub-matrix(S) having dimensions S×S (with diagonal elements corresponding to the S singular values of the matrix (M)), and a third sub-matrix (V) having dimensions C×S (with columns corresponding to the right singular vectors of the matrix (M)).

In some implementations, the matrix (M) may be modified before using the SVD algorithm. For example, columns having a sum that is less than a minimum number of interactions may be removed. Additionally, columns having a sum that is greater than a threshold value that corresponds to a maximum frequency may be removed. Removal of these columns prevents values that have not occurred a sufficient number of times to be anomalous, and values that are not rare enough to be anomalous, from influencing the characteristic types 102 that are determined. The remaining values (N) in the matrix (M) may then be weighted based on the following equation: $\log 10\,((r-n+0.5)/(n+0.5))$, in which "r" is a weighted threshold value used to determine the maximum frequency for which columns in the matrix (M) are removed.

After modifying the matrix (M) as described above, the sub-matrixes (U, S, V) may be determined. Then, for each singular value(S), a bijective mapping between rows of sub-matrix (U) and interactions, and columns of sub-matrix (U) and other sub-matrices, and a bijective mapping between rows of sub-matrix (V) and the columns of matrix (M) and between the columns of sub-matrix (V) and other sub-matrices, are determined. These mappings are used to determine target rows and columns of the matrix (M) that represent characteristic types 102 having characteristic values 112(1) with a frequency of occurrence that may potentially be anomalous.

In other implementations, sets of similar interactions 110(1) may be determined using dense-sub-matrix extraction algorithms or genetic search algorithms. For example, a dense-sub-matrix extraction algorithm may determine a region within a larger matrix having a selected size that contains the largest amount of non-null values, or the largest amount of a selected value. As another example, a genetic algorithm may include an optimization problem for selection among a population of candidate solutions, in which the fitness of each candidate is evaluated and the most fit candidates are stochastically selected.

FIG. 1 depicts an example interaction of the similar interactions 110(1) including a set of characteristic types 102, each characteristic type 102 associated with a corresponding characteristic value 112(1). Each interaction of the similar interactions 110(1) may have a characteristic value 112(1) that matches or is within a threshold similarity of the characteristic values 112(1) shown in the example interaction. For example, if a large number of similar interactions 110(1) that occur within a threshold period of time are associated with an e-mail address that includes the string "abc" followed by the e-mail domain "example.com", requests items to be shipped to a shipping zip code of "12345", and each of the ordered items corresponds to an "electronics" item category, this occurrence of identical or similar characteristic values 112(1) may indicate that the interactions are potentially anomalous. In some implementations, the historical interaction data 106 may include an anomaly determination 118(1) indicative of one or more types of anomalous interactions that were determined to apply to the set of similar interactions 110(1). For example, FIG. 1 depicts an anomaly determination 118(1) indicating that the similar interactions 110(1) were determined to include fraudulent purchases. FIG. 1 depicts the example interaction of the set of similar interactions 110(1) having a characteristic type 102 "Email Prefix" and a corresponding characteristic value 112(1) of "abc", a characteristic type 102 "Email Domain" and a corresponding characteristic value 112(1) of "example.com", a characteristic type 102 of "Shipping Zip Code" and a characteristic value 112(1) of "12345", and a characteristic type of "Item Category" and a characteristic value 112(1) of "Electronics". While FIG. 1 depicts the example interaction associated with four characteristic types 102 and corresponding characteristic values 112(1), any number of matching or similar characteristic values 112(1) may be determined, and any number of non-matching or dissimilar characteristic values (not shown in FIG. 1) may also be determined.

Based on the set of similar interactions 110(1), the website server(s) 104 may determine a set of characteristic types 102 that are associated with the characteristic values 112(1) indicative of potentially anomalous interactions in the historical interaction data 106. The characteristic types 102 may then be used to determine potentially anomalous interactions in other interaction data, independent of the characteristic values 112 associated with those interactions.

For example, at a second time T2 after the first time T1, interaction data that represents interactions associated with user devices 108 accessing the website associated with the website server(s) 104 may be determined. Each interaction associated with this interaction data may be associated with a set of characteristics, each characteristic represented by a characteristic type 102 and a characteristic value 112(2). If a set of characteristic values 112(2) occur a number of times within a period of time greater than a threshold frequency, or if a frequency of occurrence for a set of characteristic values 112(2) changes more than a threshold amount within a period of time, this may be indicative of potentially anomalous interactions. Conventional systems attempt to determine potentially anomalous interactions by analyzing interaction data to identify characteristic values 112(2) that match or are similar to characteristic values 112(1) determined based on historical interaction data 106 that were associated with anomalous interactions. This approach may have limited effectiveness when attempting to detect types of anomalous interactions that have not occurred previously and do not have characteristic CZvalues 112(2) that match historical values.

As shown in FIG. 1, the characteristic types 102 determined at the first time T1 may be used to analyze interactions associated with the user devices 108 independent of the characteristic values 112(2) associated with the interactions. For example, using the characteristic types 102 determined at the first time T1, a set of similar interactions 110(2) may be determined based on interaction data associated with the user devices 108 that access and interact with the website associated with the website server(s) 104. As shown in FIG. 1, a set of similar interactions 110(2) having matching or similar characteristic values 112(2) for the characteristic types 102 determined at the first time T1 may be determined as potentially anomalous interactions. For example, FIG. 1 depicts an example interaction of the set of similar interactions 110(2) (such as a transaction to purchase an item) having the characteristic type 102 "Email Prefix" (determined based on the historical interaction data 106 and a corresponding characteristic value 112(2) "DEF", which did not occur in the historical interaction data 106. Similarly, the example interaction is shown having the characteristic type 102 "Email Domain" (determined based on the historical data 106) and the corresponding characteristic value 112(2) "DEF" (which did not occur in the historical interaction data 106), the characteristic type 102 "Shipping Zip Code" (determined based on the historical interaction data 106) and the corresponding characteristic value 112(2) "67890" (which did not occur in the historical interaction data 106), and the characteristic type "Item Category" (determine based on the historical interaction data 106) and the corresponding characteristic value 112(2) "Clothing" (which did not occur in the historical interaction data 106). Analysis of the interaction data associated with the user devices 108 may therefore identify a set of similar interactions 110(2), which may potentially include anomalous interactions, using characteristic types 102 determine based on historical interaction data 106, independent of the particular characteristic values 112(2) associated with the similar interactions 110(2), even in cases where the characteristic values 112(2) differ from the historical characteristic values 112(1) or did not occur in the historical interaction data 106.

In response to the set of similar interactions 110(2) having characteristic values 112(2) that occur at a frequency greater than a threshold frequency or a change in frequency greater than a threshold amount, the website server(s) 104 may determine output data 114 indicative of the interactions associated with the characteristic values 112(2). The output data 114 may include interaction identifiers 116 indicative of at least a portion of the similar interactions 110(2). The interaction identifiers 116 may include any manner of data that may be used to differentiate an interaction from other interactions, and in some cases may include data indicative of one or more characteristics associated with the interaction, such as a network address, user account, transaction identifier, and so forth. In some implementations, the output data 114 may include an indication of one or more of the characteristic values 112(2) associated with the interactions represented by the interaction identifiers 116. Additionally, in some implementations, the output data 114 may include an anomaly determination 118(2) indicative of whether the interactions represented by the interaction identifiers 116 are identified as anomalous, and in some cases a type of anomalous interaction associated with the interactions. In some cases, the anomaly determination 118(2) may be represented by a score, such as a risk value or other type of probability value that represents a likelihood that the interactions represented by the interaction identifiers 116 are anomalous. In some implementations, the anomaly determination 118(2) may be determined by determining the characteristic values 112(2) associated with the characteristic types 102 determined at the first time T1, determining the similar interactions 110(2) that include the characteristic values 112(2), and determining that the frequency of occurrence of the characteristic values 112(2) exceeds a threshold frequency. In other implementations, an anomaly determination 118 may be determined using a separate computing device, system, or manual review.

Figure 2A:
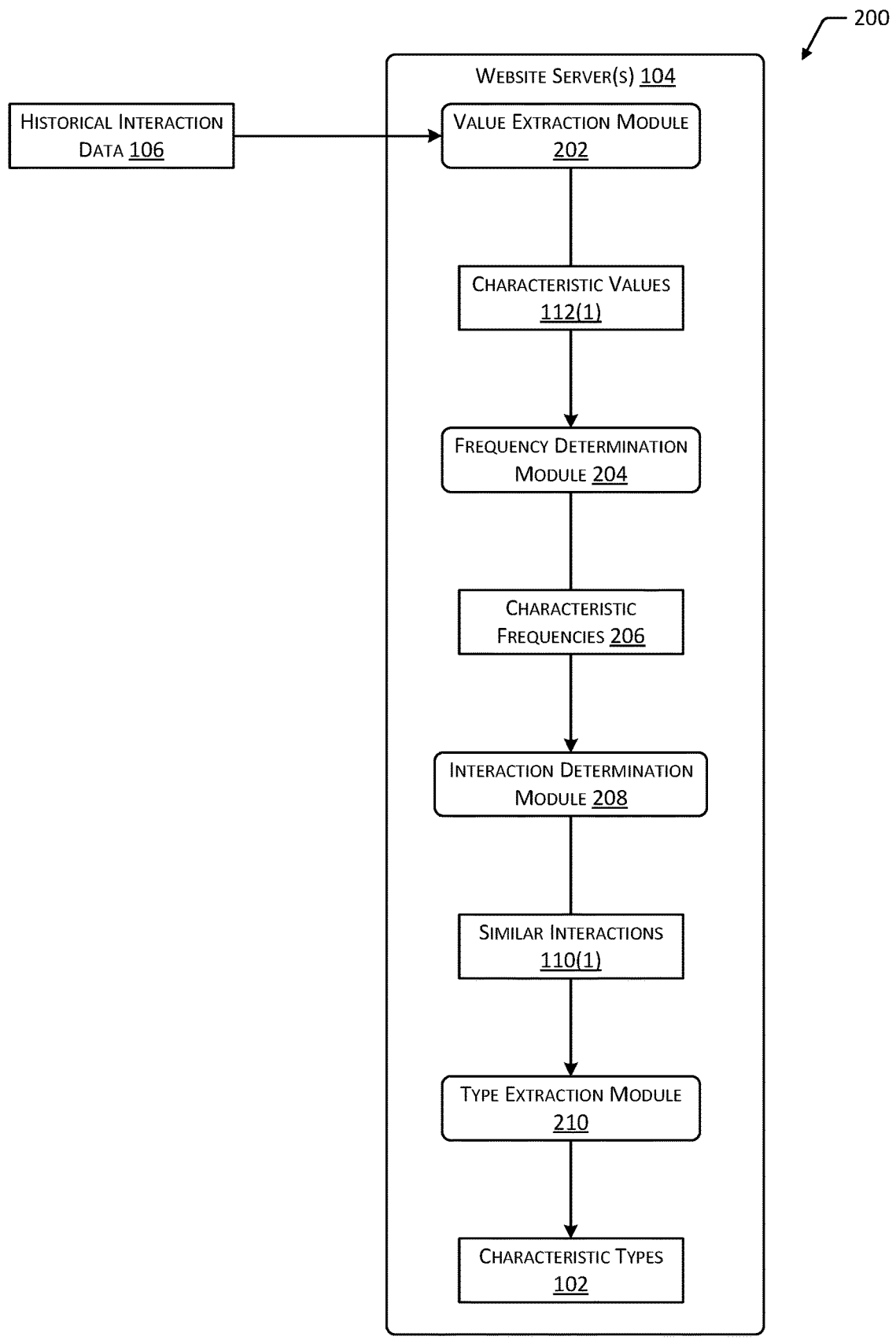
FIG. 2A is a diagram depicting an implementation of a system for determining characteristic types associated with potentially anomalous historical interactions.

FIG. 2A is a diagram 200 depicting an implementation of a system for determining characteristic types 102 associated with potentially anomalous historical interactions. As described with regard to FIG. 1, historical interaction data 106 may represent interactions, for a previous time period, between one or more website servers 104 and one or more other computing devices, such as interactions between users and a website associated with the website servers 104. For example, interactions may represent webpages accessed by user devices 108, such as webpages that include information regarding an item, transactions associated with items (e.g., goods or services) such as purchases, returns, leases, or subscriptions, received user input such as ratings, reviews, search queries, or selection of various user interface elements, and so forth.

A value extraction module 202 associated with the website server(s) 104 may determine the characteristic values 112(1) associated with the interactions represented by the historical interaction data 106. For example, each interaction may have multiple characteristics, such as hardware or software components of a computing device that accesses a website, a network address associated with the computing device, characteristics of items accessed or purchased, characteristics of a user account (such as location or account age), characteristics of payment instruments or institutions, characteristics of shipping locations or methods, and so forth. Each characteristic of an interaction may have a characteristic type 102 and a characteristic value 112(1). For example, a characteristic type 102 may include an indication of the category or nature of a characteristic, such as "IP Address", while a characteristic value 112(1) may include a specific text or numerical value, or other type of data that corresponds to the characteristic type 102. Continuing the example, for a characteristic type 102 of "IP Address", a corresponding characteristic value 112(1) may be "1234:5678:a9:b01:c234:5678:d9ef: 0ghi". As another example, a characteristic type 102 may include a location associated with a user device 108 accessing the website server(s) 104 and a corresponding characteristic value 112(1) may be "Country A". In some implementations, the value extraction module 202 may perform one or more processing steps or transforms on the determined characteristic values 112(1). For example, determined characteristic values 112(1) may be normalized or scaled. As another example, one or more transforms may be used to determine alternate characteristic values 112(1) that are identical or similar to a corresponding characteristic value 112(1) determined based on the historical interaction data 106. Determination of alternate characteristic values 112(1) may enable identification of potentially anomalous interactions having characteristic values 112(1) that do not identically match characteristic values 112(1) in the historical interaction data 106.

A frequency determination module 204 associated with the website server(s) 104 may determine characteristic frequencies 206 associated with one or more characteristic values 112(1) associated with the historical interaction data 106. A characteristic frequency 206 may be represented as a number of times a particular characteristic value 112(1) occurs over a selected period of time. In some implementations, the frequency determination module 204 may determine a count of occurrences of one or more characteristic values 112(1) in addition to or in place of a frequency. Additionally, in some implementations, the frequency determination module 204 may determine a rate of change of occurrences over time in addition to or in place of a frequency. As such, the determined characteristic frequencies 206 may include various metrics that represent the occurrence of particular characteristic values 112(1) in the historical interaction data 106.

Based on the determined characteristic frequencies 206, an interaction determination module 208 associated with the website server(s) 104 may determine a set of similar interactions 110(1). In some implementations, each interaction of the similar interactions 110(1) may be selected based on an anomaly determination 118(1) indicated in the historical interaction data 106. In other implementations, the similar interactions 110(1) may be determined based on a pattern of characteristic values 112(1) that each occur in the historical interaction data 106 at a frequency greater than an associated threshold frequency for that characteristic value 112(1), or that are associated with a change in frequency that exceeds a threshold value. For example, if a number of interactions that occur within a period of time and that are associated with the same e-mail prefix, shipping zip code, and category of purchased item exceed a usual or expected frequency for such characteristic values 112(1), each interaction associated with these characteristic values 112(1) may be determined and included in the set of similar interactions 110(1). Continuing the example, the number of occurrences of a particular characteristic value 112(1) during a period of time may be used to determine a normal or expected frequency of occurrence of the characteristic value 112(1). In other implementations, a rate of change of the frequency of occurrences of the characteristic value 112(1) may also be determined. For example, a frequency for a set of characteristic values 112(1) that differs from a mean frequency of occurrence over a period of time by at least a threshold amount (e.g., a fixed or percentage amount, an amount determined based on the standard deviation from the mean, and so forth) may be indicative of a potentially anomalous interaction.

A type extraction module 210 associated with the website server(s) 104 may determine the characteristic types 102 associated with the characteristic values 112(1) for the set of similar interactions 110(1). For example, if the similar interactions 110(1) are each associated with an e-mail address that includes the prefix "abc" or a similar string, the e-mail domain "example.com" or a similar e-mail domain, a shipping zip code of "12345" or a similar shipping zip code, and an item category of "electronics" or a similar item category, the type extraction module 210 may determine the characteristic types 102 that correspond to the characteristic values 112(1), such as "e-mail prefix", "e-mail domain", "shipping zip code" and "item category". As described with regard to FIG. 1, the characteristic types 102 determined based on the historical interaction data 106 may be used to determine potential anomalous interactions from other sources of interaction data, even in cases where the characteristic values 112(2) associated with those interactions do not occur in the similar interactions 110(1), or in some cases do not occur in the historical interaction data 106.

Figure 2B:
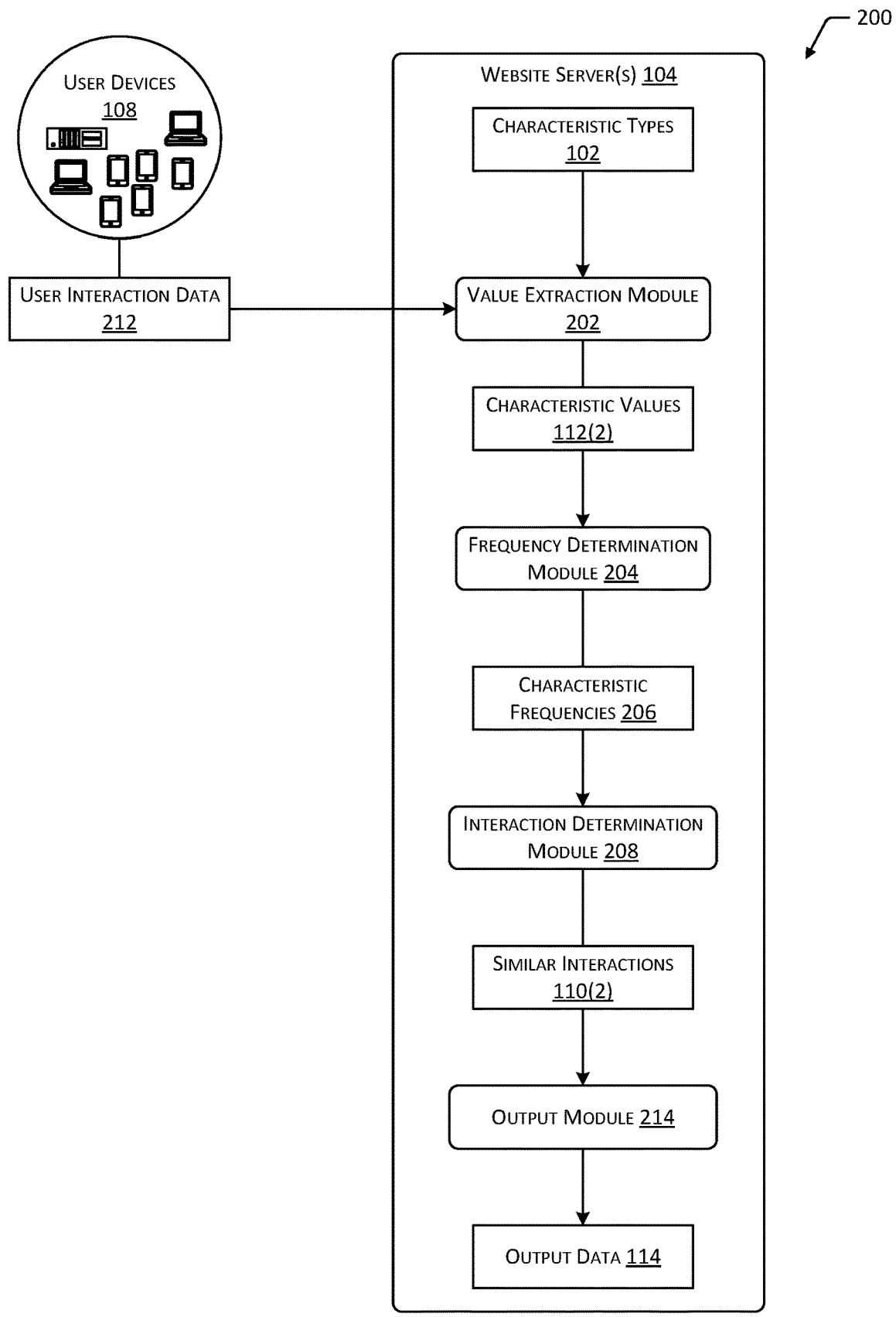
FIG. 2B is a diagram depicting use of the system of 2A to determine potentially anomalous future interactions using the characteristic types determined in FIG. 2A.

FIG. 2B is a diagram 200 depicting use of the system of 2A to determine potentially anomalous future interactions using the characteristic types 102 determined in FIG. 2A. As user devices 108 access a website or other system associated with the website server(s) 104, data may be received from and provided to the user devices 108. User interaction data 212 may represent the interactions between the user devices 108 and a website or other system. For example, each interaction associated with the user interaction data 212 may have various characteristics based on the particular user device 108 or user account associated with the interaction, the particular webpages or other interface elements accessed by the user device 108, and so forth. Each characteristic of an interaction may be associated with a characteristic type 102 and a corresponding characteristic value 112(2).

As described with regard to FIG. 2A, a set of characteristic types 102 that were associated with a set of similar interactions 110(1) determined based on historical interaction data 106 may be used to determine potentially anomalous interactions associated with the user interaction data 212. The value extraction module 202 may be used to determine characteristic values 112(2) that correspond to the determined characteristic types 102 for the interactions represented by the user interaction data 212. For example, if the characteristic types 102 determined based on the historical interaction data 106 include "e-mail prefix", "e-mail domain", "shipping zip code", and "item category", the determined characteristic values 112(2) may include values that correspond to the determined characteristic types 102 for at least a subset of the interactions represented by the user interaction data 212. The characteristic values 112(2) associated with the user interaction data 212 may not necessarily occur in the historical interaction data 106, however the characteristic types 102 determined based on the historical interaction data 106 may be used to determine potentially anomalous interactions based on the characteristic values 112(2) of the user interaction data 212 independent of the particular characteristic values 112(2) that are present.

The frequency determination module 204 may determine characteristic frequencies 206 associated with one or more of the determined characteristic values 112(2). The interaction determination module 208 may determine a set of similar interactions 110(2) represented by the user interaction data 212 that have identical or similar characteristic values 112(2) for the characteristic types 102 determined based on the historical interaction data 106. For example, if a number of interactions that occur within a period of time and that are associated with the same or similar e-mail prefix, e-mail domain, shipping zip code, and item category exceed an expected or usual frequency for these characteristic values 112(2), the set of similar interactions 110(2) may include potentially anomalous interactions.

An output module 214 associated with the website server(s) 104 may determine output data 114 based on the similar interactions 110(2). As described with regard to FIG. 1, in some implementations, the output data 114 may include interaction identifiers 116 or other data indicative of at least a portion of the similar interactions 110(2). In some implementations, the output data 114 may include an indication of one or more of the characteristic values 112(2) associated with the similar interactions 110(2). Additionally, in some implementations, the output data 114 may include an anomaly determination 118(2) for one or more of the similar interactions 110(2), which may indicate whether the similar interaction(s) 110(2) are associated with one or more types of anomalous interactions. In some cases, the anomaly determination 118 may be represented by a score, such as a risk value or probability value that represents a likelihood that the similar interaction(s) 110(2) are particular types of anomalous interactions. In some implementations, the output module 214 may be configured to determine the similar interactions 110(2), or an anomaly determination 118(2) associated with one or more of the similar interactions 110(2), based in part on the number of occurrences of a particular characteristic value 112(2) or set of characteristic values 112(2) during a period of time. For example, if a frequency of occurrence of a set of characteristic values 112(2) deviates from a normal or expected frequency of occurrence, or if a change in the frequency of occurrence exceeds a threshold value, this may indicate a potentially anomalous interaction.

Figure 3A:
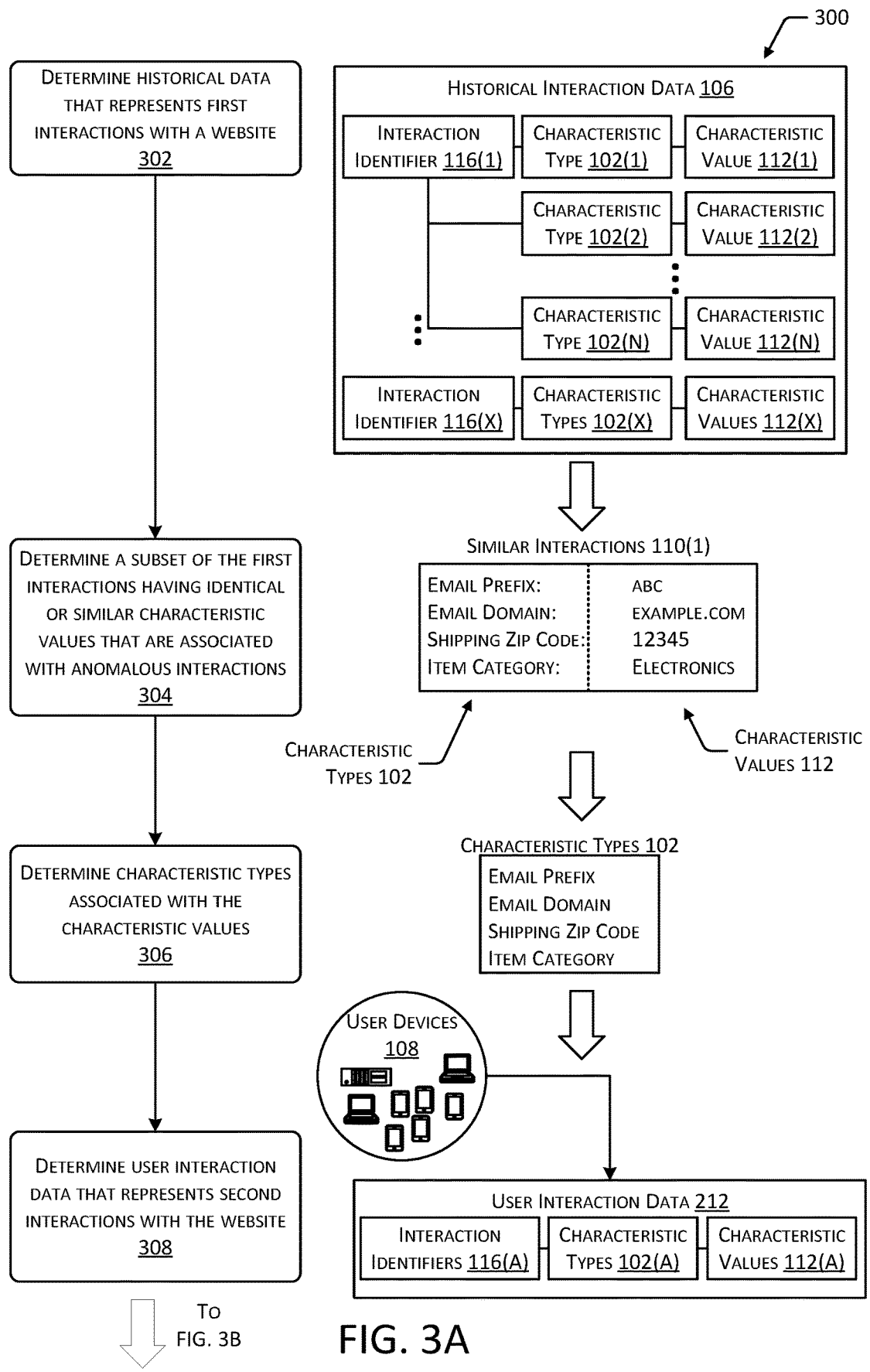
FIGS. 3A and 3B are diagrams depicting a method for determining characteristic types associated with potentially anomalous interactions from a first source and use of the characteristic types to determine potentially anomalous interactions from a second source.
Figure 3B:
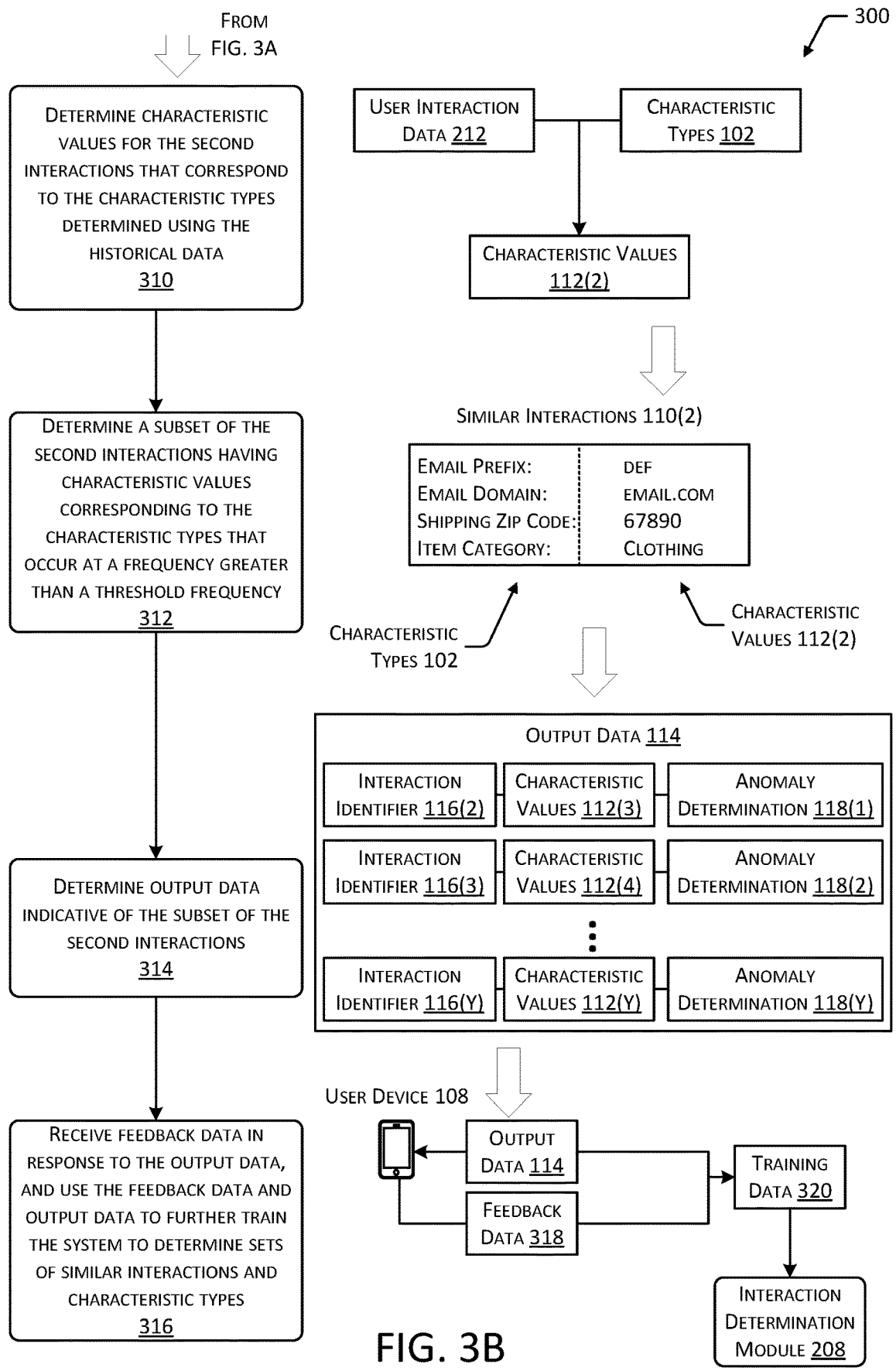

FIGS. 3A and 3B are diagrams 300 depicting a method for determining characteristic types 102 associated with potentially anomalous interactions from a first source and use of the characteristic types 102 to determine potentially anomalous interactions from a second source. At 302, historical data that represents first interactions with a website may be determined. For example, historical interaction data 106 may represent multiple interactions between computing devices and one or more website servers 104 associated with a website or other type of system. Each interaction may be associated with an interaction identifier 116, which may include any type of data that may be distinguished from other interaction identifiers 116 to enable data associated with a particular interaction to be differentiated from data associated with one or more other interactions. Each interaction may also be associated with multiple characteristics, each characteristic represented by a characteristic type 102 and a characteristic value 112 for that characteristic type 102. For example, a characteristic type 102 may include "User Device Location", and a corresponding characteristic value 112 may include an indication of a particular city, state, country, or other type of geographic location.

As one example, FIG. 3A depicts the historical interaction data 106 including a first interaction identifier 116(1) associated with a first interaction. The first interaction identifier 116(1) is associated with a first characteristic type 102(1) and a first characteristic value 112(1) for the associated first characteristic type 102(1). Similarly, the first interaction identifier 116(1) is associated with a second characteristic type 102(2) and second characteristic value 112(2) for the second characteristic type 102(2), and any number of additional characteristic types 102(N), each of which may be associated with a corresponding characteristic value 112(N). Any number of additional interaction identifiers 116(X) that represent interactions may similarly be associated with any number of corresponding characteristic types 102(X), each of which may be associated with a corresponding characteristic value 112(X).

At 304, a subset of the first interactions represented by the historical data may be determined that have identical or similar characteristic values 112 that are associated with anomalous interactions. In some implementations, the subset of the first interactions may be determined based on an anomaly determination 118(1) in the historical interaction data 106. In other implementations, potentially anomalous interactions may be determined based on a set of characteristic values 112 that occur at a frequency greater than a threshold frequency or that are associated with a change in frequency greater than a threshold value. For example, a frequency that deviates from a mean, mode, or other normal or expected rate of occurrence of a particular characteristic value 112 may indicate a potentially anomalous interaction. Continuing the example, purchases of items associated with the item category "Electronics" that are shipped to a shipping zip code of "12345" may typically occur at a frequency that is close to a normal or expected frequency for these characteristic values 112. However, if a large number of interactions associated with the item category "Electronics" and the shipping zip code "12345" occur within a short period of time, this increased frequency of occurrence for this set of characteristic values 112 may indicate that the interactions associated with those characteristic values 112 are anomalous. As such, a set of similar interactions 110(1) may be determined that have identical or similar characteristic values 112 that occur at an increased frequency during a period of time. For example, FIG. 3A depicts a set of similar interactions 110(1) having the same or similar characteristic values 112 for the characteristic types 102 "Email Prefix", "Email Domain", "Shipping Zip Code", and "Item Category".

At 306, the characteristic types 102 associated with the characteristic values 112 of the similar interactions 110(1) may be determined. As described with regard to FIGS. 1, 2A, and 2B, the characteristic types 102 associated with sets of similar interactions 110(1) determined using historical interaction data 106 may be used to determine potentially anomalous interactions based on the characteristic values 112 of other interactions, independent of the particular characteristic values 112 that occur in the other interactions.

At 308, user interaction data 212 that represents second interactions between one or more user devices 108 and the website associated with the website server(s) 104 may be determined. The user interaction data 212 may include any number of interactions, which in some implementations may be represented by corresponding interaction identifiers 116 (A). Each interaction may be associated with multiple characteristics, each characteristic represented by a characteristic type 102(A) and a corresponding characteristic value 112 (A). For example, FIG. 3A depicts one or more interaction identifiers 116(A), each of which may be associated with any number of characteristic types 102(A), which in turn may each be associated with a corresponding characteristic value 112(A).

As shown in FIG. 3B, at 310, characteristic values 112(2) that correspond to the determined characteristic types 102 may be determined for the second interactions of the user interaction data 212. For example, each interaction of the user interaction data 212 may have multiple characteristics, each characteristic associated with a characteristic type 102 and characteristic value 112. As such, for each characteristic type 102 determined based on the historical interaction data 106, each interaction of the user interaction data 212 may include a corresponding characteristic value 112(2). The characteristic values 112(2) associated with the user interaction data 212 may not necessarily occur in the similar interactions 110(1) of the historical interaction data 106 that were used to determine the characteristic types 102. Additionally, in some implementations, the characteristic values 112(2) associated with the user interaction data 212 may not occur in the historical interaction data 106. For example, a set of anomalous interactions associated with the user interaction data 212 may include new types of malicious or anomalous interactions that have not previously been observed by the system.

At 312, a subset of the second interactions having characteristic values 112(2) corresponding to the characteristic types 102 that occur at a frequency greater than a threshold frequency may be determined. For example, as described with regard to FIG. 2B, an output module 214 may be configured to determine the similar interactions 110(2), or an anomaly determination 118(2) associated with one or more of the similar interactions 110(2), based in part on the number of occurrences of a particular characteristic value 112(2) or set of characteristic values 112(2) during a period of time. For example, if a frequency of occurrence of a set of characteristic values 112(2) deviates from a normal or expected frequency of occurrence, or if a change in the frequency of occurrence exceeds a threshold value, this may indicate a potentially anomalous interaction. Continuing the example, if a large number of interactions that occur within a period of time have similar or identical characteristic values 112(2) for the characteristic types 102, these interactions may be included in the set of similar interactions 110(2) as potentially anomalous.

At 314, output data 114 indicative of the subset of the second interactions may be determined. For example, output data 114 may cause presentation of an output that includes information regarding at least a portion of the set of similar interactions 110(2). Continuing the example, output data 114 may associate an interaction identifier 116(2) for a first interaction with at least a portion of the characteristic values 112(3) associated with that interaction, and in some implementations with an anomaly determination 118(1) that indicates a potential type of anomalous interaction. FIG. 3B also depicts the output data 114 associating an interaction identifier 116(3) for a second interaction with corresponding characteristic values 112(4) and an anomaly determination 118(2), and any number of additional interaction identifiers 116(Y) with corresponding characteristic values 112(Y) and anomaly determinations 118(Y).

At 316, feedback data 318 may be received in response to the output data 114, and the feedback data 318 and output data 114 may be used to further train the system to determine sets of similar interactions 110 and characteristic types 102. For example, based on the output data 114, one or more actions may be performed, such as preventing shipment of items, preventing transmission of communications, preventing access by a user account to particular functions, and so forth. Feedback data 318 received in response to the output data 114 or associated action may be used to determine whether one or more interactions in the set of similar interactions 110(2) were anomalous or non-anomalous. The feedback data 318 and output data 114 may be used as training data 320 to further train the interaction determination module 208, and in some cases one or more other components of the system, to determine sets of similar interactions 110 and potentially anomalous interactions.

Figure 4:
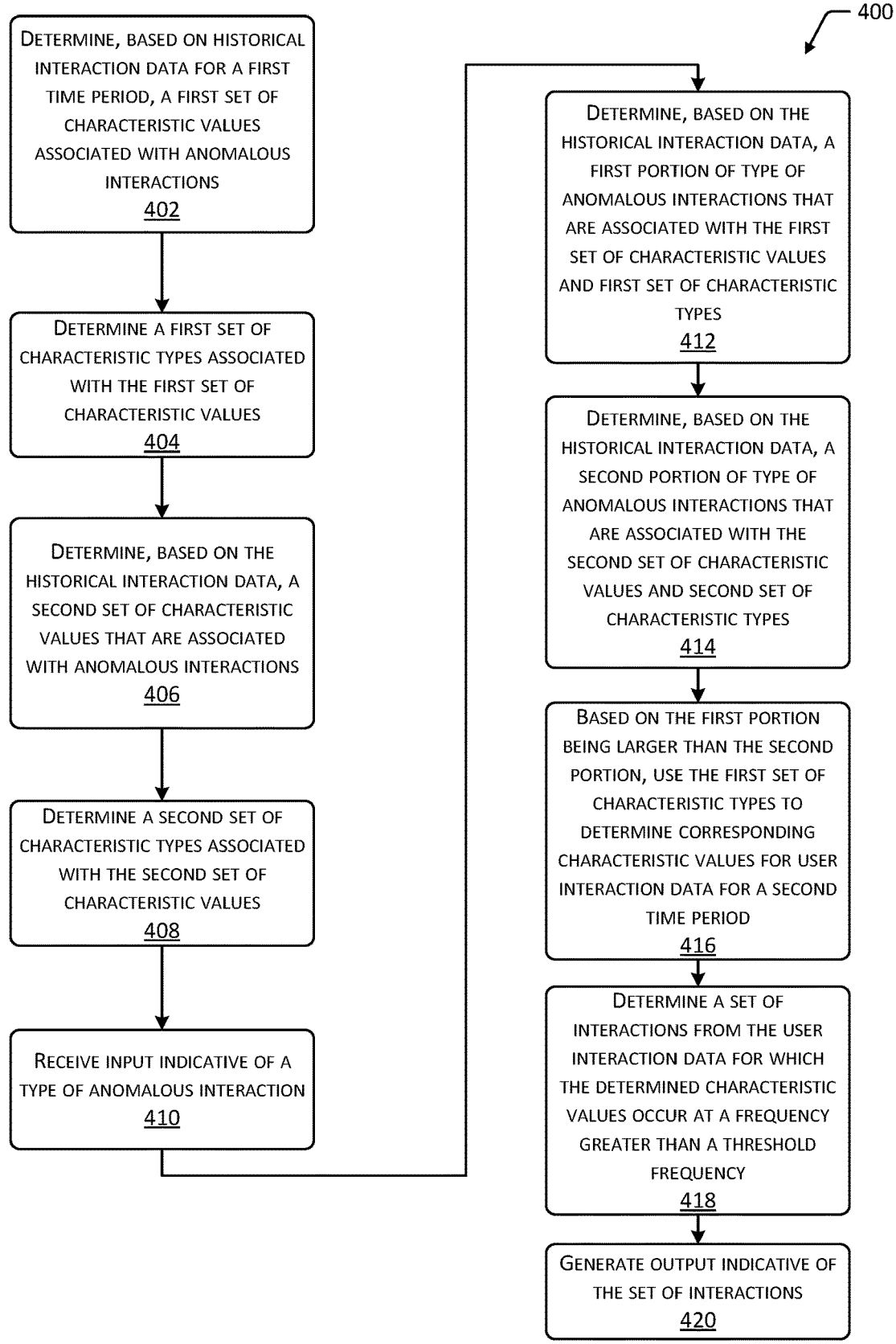
FIG. 4 is a flow diagram depicting a method for determining multiple sets of characteristic types associated with potentially anomalous historical interactions and using a particular set of characteristic types to determine future interactions that may be a selected type of anomalous interaction.

FIG. 4 is a flow diagram 400 depicting a method for determining multiple sets of characteristic types 102 associated with potentially anomalous historical interactions and using a particular set of characteristic types 102 to determine future interactions that may be a selected type of anomalous interaction. At 402, based on historical interaction data 106 for a first time period, a first set of characteristic values 112(1) may be determined that are associated with anomalous interactions. In some implementations, historical interaction data 106 may include an anomaly determination 118(1) indicative of particular interactions that were determined to be anomalous. In other implementations, a set of characteristic values 112(1) that occur at a frequency greater than a usual or expected frequency, or that are associated with a change in frequency greater than a threshold value, may be determined to be potentially anomalous.

At 404, a first set of characteristic types 102 associated with the first set of characteristic values 112(1) may be determined. Each characteristic may include a particular characteristic type 102 and a characteristic value 112(1) associated with that characteristic type 102. For example, a characteristic type 102 may be "account age" associated with a user account, and each interaction of the set of similar interactions 110(1) may be associated with a characteristic value 112(1) for the characteristic type 102 that is identical or similar to each other characteristic value 112(1), or is otherwise related to each other characteristic. For example, the set of similar interactions 110(2) may include a set of interactions having a characteristic value 112(1) for the characteristic type 102 "account age" ranging from zero to two months.

At 406, based on the historical interaction data 106, a second set of characteristic values 112(1) that are associated with anomalous interactions (or that occur at a frequency greater than a threshold frequency) may be determined. For example, the historical interaction data 106 may include a second set of similar interactions 110(1) associated with a different set of characteristic values 112(1) that correspond to different characteristic types 102 than the set of similar interactions 110(1) described at 402. Any number of sets of characteristic values 112 that are associated with anomalous interactions or that are associated with a frequency or change in frequency that deviates from a threshold value may be determined in this manner.

At 408, a second set of characteristic types 102 associated with the second set of characteristic values 112(1) may be determined. The set of characteristic types 102 associated with the second set of characteristic values 112(1) may differ from the previous set of characteristic types 102 associated with the first set of characteristic values 112(1), however in some cases, one or more characteristic values 112(1) may be common between different sets of characteristic values 112(1).

At 410, input indicative of a type of anomalous interaction may be received. For example, a user or automated system may select a type of anomalous interaction, such as fraud or abuse, and may provide an indication of this selection. Different sets of characteristic types 102 may be more useful for identifying particular types of anomalous interactions based on the types of anomalous interactions within the historical interaction data 106 from which the sets of characteristic types 102 were determined, and in some cases based on the types of anomalous interactions indicated in the historical interaction data 106.

At 412, based on the historical interaction data 106, a first portion of the type of the anomalous interactions within the historical interaction data 106 that are associated with the first set of characteristic values 112(1) and the first set of characteristic types 102 may be determined. For example, a subset of the interactions represented by the historical interaction data 106 may include fraudulent interactions. The first set of characteristic values 112(1) determined at 404 and the first set of characteristic types 102 determined at 406 may be associated with at least a portion of the fraudulent interactions. The size of the portion of the fraudulent interactions associated with the first set of characteristic types 102 may be indicative of the effectiveness of the first set of characteristic types 102 for determining fraudulent interactions in other bodies of interaction data. In some implementations, a risk value, probability value, score, or other type of metric indicative of the number or size of the portion of fraudulent interactions associated with the first set of characteristic types 102 may be determined.

At 414, based on the historical interaction data 106, a second portion of the type of anomalous interactions associated with the historical interaction data 106 that are associated with the second set of characteristic values 112(1) and the second set of characteristic types 102 may be determined. For example, a different portion of the fraudulent interactions of the historical interaction data 106 may be associated with the second set of characteristic values 112(1) and the second set of characteristic types 102. If this portion of the fraudulent interactions is smaller than the portion associated with the first set of characteristic types 102, this may indicate that the first set of characteristic types 102 is more suitable for determining fraudulent interactions. In some implementations, actions described with regard to 410, 412, and 414 may be repeated for different types of anomalous interactions to determine sets of characteristic types 102 that are suitable for determining other types of anomalous interactions.

For example, multiple sets of characteristic types 102 may be used to analyze user interaction data 212 to determine multiple types of anomalous interactions, and to maximize the anomalous interactions that are determined. In some implementations, multiple sets of characteristic types 102 may be used to determine a particular type of anomalous interaction. For example, a first set of characteristic types 102 associated with the largest portion of fraudulent interactions included in historical interaction data 106 may be determined and selected for use. A second set of characteristic types 102 may then be determined that is associated with the largest portion of fraudulent interactions of the historical interaction data 106 that do not include the fraudulent interactions associated with the first set of characteristic types 102. In a similar manner, a third set of characteristic types 102, and any number of additional sets of characteristic types 102, may be determined for use detecting fraudulent interactions, until a threshold number of sets of characteristic types 102 have been determined, or a threshold portion of anomalous interactions have been associated with a set of characteristic types 102.

At 416, based on the first portion of the type of anomalous interactions being larger than the second portion, the first set of characteristic types 102 determined at 404 may be used to determine corresponding characteristic values 112(2) for user interaction data 212 associated with a second time period. For example, at least a portion of the user interaction data 212 may include anomalous interactions of the type indicated at 410. Each interaction represented by the user interaction data 212 may be associated with multiple characteristics, each characteristic having a characteristic type 102 and a corresponding characteristic value 112(2). If a large number of user interactions occur within a period of time having identical or similar characteristic values 112(2) that correspond to the first set of characteristic types 102, one or more of these user interactions may potentially be anomalous interactions of the type indicated at 410.

At 418, a set of interactions from the user interaction data 212 for which the determined characteristic values 112(2) occur at a frequency greater than a threshold frequency may be determined. As described with regard to FIG. 2B, an output module 214 may be configured to determine a set of similar interactions 110(2) having identical or similar characteristic values 112(2) for the characteristic types 102, and in some cases an anomaly determination 118(2) associated with one or more of the similar interactions 110(2), based in part on the number of occurrences of a particular characteristic value 112(2) or set of characteristic values 112(2) during a period of time. The characteristic values 112(2) associated with the user interaction data 212 may not necessarily occur in the historical interaction data 106. However, potentially anomalous interactions associated with the user interaction data 212 may be determined using the characteristic types 102 that were determined based on the historical interaction data 106 independent of the particular characteristic values 112(2) associated with the user interaction data 212.

At 420, output indicative of the determined set of interactions from the user interaction data 212 may be generated. For example, an output may present interaction identifiers 116 or other data indicative of particular interactions that are potentially anomalous, and in some implementations, one or more characteristic values 112(2) that may be indicative of the anomalous nature or type of anomalous interaction. In some implementations, the output may also include an anomaly determination 118 that indicates a risk, probability, or other metric indicative of a likelihood that an interaction is anomalous. As described with regard to FIG. 3B, in some implementations, output data 114, and in some cases feedback data 318 received in response to an output, may be used to further train the system to determine sets of similar interactions 110 and characteristic types 102 usable to determine anomalous interactions.

Figure 5:
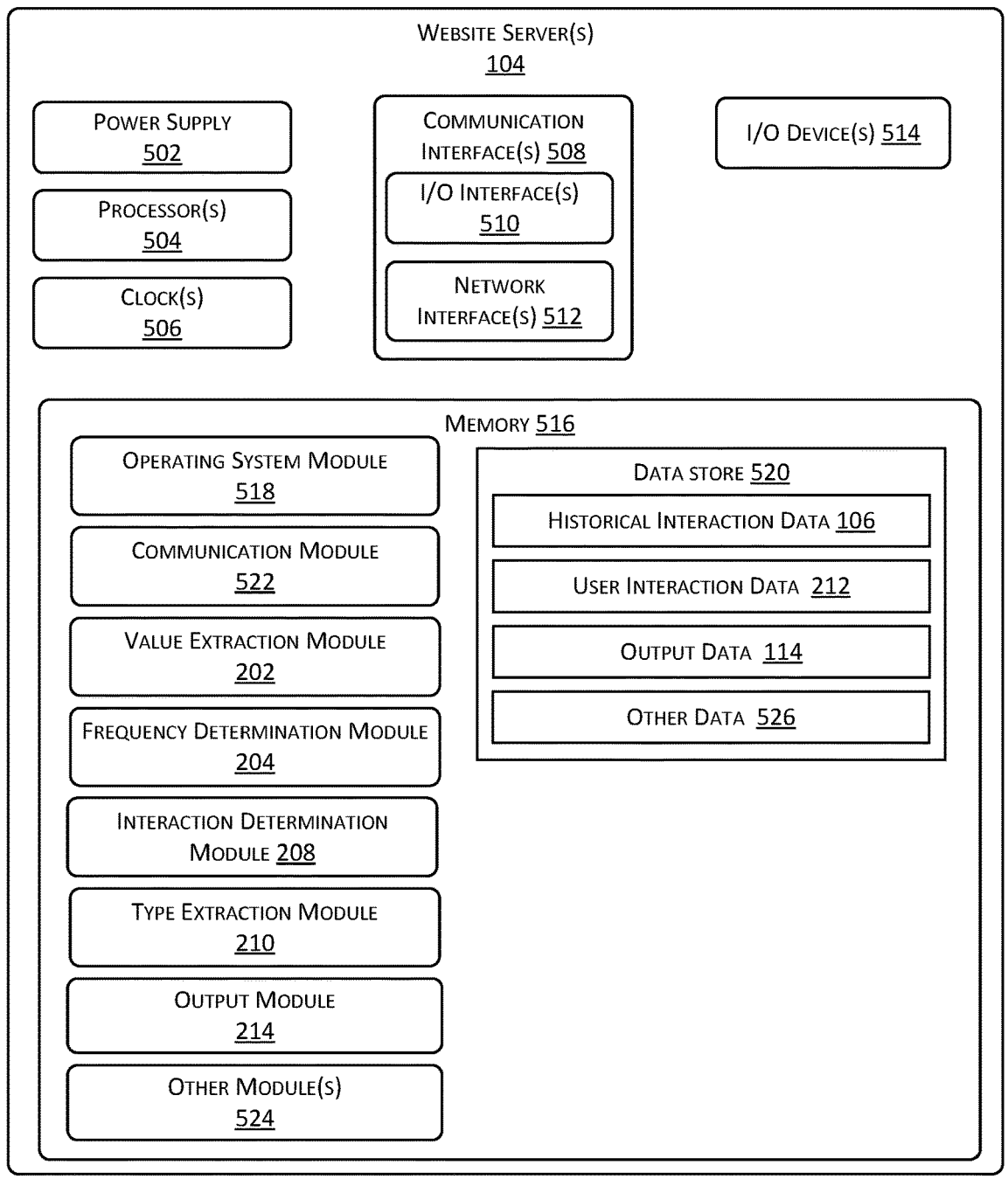
FIG. 5 is a block diagram depicting a computing device within the present disclosure.

FIG. 5 is a block diagram 500 depicting a computing device within the present disclosure. The computing device may include one or more website servers 104, as described with regard to FIGS. 1 through 2B. In other implementations, the computing device may include personal computing devices, one or more wearable computing devices, networked media devices, vehicle-based computing devices, and so forth. Additionally, while FIGS. 1-4 describe use of website servers 104, various functions described with regard to the website server(s) 104 may be performed by a user device 108, or other computing devices in communication with the website server(s) 104. Therefore, while FIG. 5 depicts a single block diagram 500, the depicted computing device may include any number of computing devices of similar or different types.

One or more power supplies 502 may be configured to provide electrical power suitable for operating the components of the computing device. In some implementations, the power supply 502 may include a rechargeable battery, fuel cell, photovoltaic cell, power conditioning circuitry, and so forth.

The computing device may include one or more hardware processor(s) 504 (processors) configured to execute one or more stored instructions. The processor(s) 504 may include one or more cores. One or more clock(s) 506 may provide information indicative of date, time, ticks, and so forth. For example, the processor(s) 504 may use data from the clock 506 to generate a timestamp, trigger a preprogrammed action, and so forth.

The computing device may include one or more communication interfaces 508, such as input/output (I/O) interfaces 510, network interfaces 512, and so forth. The communication interfaces 508 may enable the computing device, or components of the computing device, to communicate with other computing devices or components of the other computing devices. The I/O interfaces 510 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 510 may couple to one or more I/O devices 514. The I/O devices 514 may include any manner of input devices or output devices associated with the computing device. For example, I/O devices 514 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, I/O devices 514 may be physically incorporated with the computing device. In other implementations, I/O devices 514 may be externally placed.

The network interfaces 512 may be configured to provide communications between the computing device and other devices, such as the I/O devices 514, routers, access points, and so forth. The network interfaces 512 may include devices configured to couple to one or more networks including local area networks (LANs), wireless LANs (WLANs), wide area networks (WANs), wireless WANs, and so forth. For example, the network interfaces 512 may include devices compatible with Ethernet, Wi-Fi, Bluetooth, ZigBee, Z-Wave, 5G, LTE, and so forth.

The computing device may include one or more buses or other internal communications hardware or software that allows for the transfer of data between the various modules and components of the computing device.

As shown in FIG. 5, the computing device may include one or more memories 516. The memory 516 may include one or more computer-readable storage media (CRSM). The CRSM may be any one or more of an electronic storage medium, a magnetic storage medium, an optical storage medium, a quantum storage medium, a mechanical computer storage medium, and so forth. The memory 516 may provide storage of computer-readable instructions, data structures, program modules, and other data for the operation of the computing device. A few example modules are shown stored in the memory 516, although the same functionality may alternatively be implemented in hardware, firmware, or as a system on a chip (SoC).

The memory 516 may include one or more operating system (OS) modules 518. The OS module 518 may be configured to manage hardware resource devices such as the I/O interfaces 510, the network interfaces 512, the I/O devices 514, and to provide various services to applications or modules executing on the processors 504. The OS module 518 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 520 and one or more of the following modules may also be associated with the memory 516. The modules may be executed as foreground applications, background tasks, daemons, and so forth. The data store(s) 520 may use a flat file, database, linked list, tree, executable code, script, or other data structure to store information. In some implementations, the data store(s) 520 or a portion of the data store(s) 520 may be distributed across one or more other devices including other computing devices, network attached storage devices, and so forth.

A communication module 522 may be configured to establish communications with one or more other computing devices. Communications may be authenticated, encrypted, and so forth.

The memory 516 may also store the value extraction module 202. The value extraction module 202 may determine characteristic values 112 based on interaction data. For example, interaction data may represent multiple interactions, each interaction being associated with multiple characteristics. The characteristics may include characteristics associated with a computing device accessing a website or other system, such as a browser application or other hardware or software components associated with the device, a network address associated with the device, and so forth. The characteristics may include characteristics of webpages or other interfaces accessed by a computing device, such as characteristics of an item that is purchased or viewed, characteristics of payment instruments or shipping methods used as part of a transaction associated with an item, and so forth. The characteristics may include characteristics of a user account associated with the website or other system, such as demographic or geographic information, an e-mail address, and so forth. Each characteristic of an interaction may have a characteristic type 102 and a characteristic value 112. The value extraction module 202 may be configured to determine portions of interaction data that indicate characteristic values 112. In some implementations, the value extraction module 202 may perform one or more processing steps or transforms on the determined characteristic values 112, such as normalization or scaling operations. As another example, one or more transforms may be used to determine alternate characteristic values 112 that are identical or similar to the characteristic values 112 determined based on interaction data.

The memory 516 may store the frequency determination module 204. The frequency determination module 204 may determine frequencies of occurrence of one or more characteristic values 112 within interaction data. A characteristic frequency 206 may be represented as a number of times a particular characteristic value 112 occurs over a selected period of time. Determined characteristic frequencies 206 may be used to determine potentially anomalous interactions based on deviations between the determined frequencies and usual or expected frequencies of occurrence, and in some cases based on changes in frequencies that exceed a threshold value.

The memory 516 may also store the interaction determination module 208. The interaction determination module 208 may determine sets of similar interactions 110 in which each interaction of the set of similar interactions 110 is associated with a set of characteristic values 112 that occur at a frequency that deviates from a threshold frequency or a change in frequency that is greater than a threshold value. For example, if a number of interactions that occur within a period of time are associated with the same set of characteristic values 112 that occur more frequently than a normal or expected frequency of occurrence for the characteristic values 112, this may indicate that one or more of the similar interactions 110 are anomalous.

The memory 516 may additionally store the type extraction module 210. The type extraction module 210 may determine the characteristic types 102 associated with determined sets of characteristic values 112 for sets of similar interactions 110, based on interaction data. For example, for a set of similar interactions 110 determined to be anomalous that are each associated with a set of characteristic values 112, the characteristic types 102 associated with those characteristic values 112 may be determined and used to identify other potentially anomalous interactions associated with other interaction data.

The memory 516 may store the output module 214. The output module 214 may determine output data 114 based on a set of similar interactions 110 that may include one or more potentially anomalous interactions. In some implementations, the output data 114 may include indications of characteristic values 112 associated with the interactions. Additionally, in some implementations, the output data 114 may include one or more anomaly determinations 118 that indicate interactions that are potentially anomalous, and in some cases, a type of anomalous interaction. In some implementations, the output module 214 may determine sets of similar interactions 110 based in part on the number of occurrences of a particular characteristic value 112 or set of characteristic values 112 during a period of time, such as by determining if a frequency of occurrence of a set of characteristic values 112 deviates from a normal or expected frequency of occurrence, or if a change in the frequency of occurrence exceeds a threshold value.

Other modules 524 may also be present in the memory 516. For example, other modules 524 may include user interface modules for determining user interfaces for presentation, receiving data input to user interfaces, and so forth. Other modules 524 may include permission or authorization modules for modifying data associated with the computing device, such as threshold values, configurations or settings, and so forth. Other modules 524 may also include encryption modules to encrypt and decrypt communications between computing devices, modules to modify orders associated with purchases or returns of items, permit or prevent transmission of communications, and so forth, based on identification of potentially anomalous interactions.

Other data 526 within the data store(s) 520 may include configurations, settings, preferences, and default values associated with computing devices. Other data 526 may also include encryption keys and schema, access credentials, and so forth. Other data 526 may also include item data indicative of characteristics of items available for purchase, lease, or subscription. Additionally, other data 526 may include rules or algorithms for determining threshold values, risk or probability values indicative of anomalous interactions, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more non-transitory memories storing computer-executable instructions; and
one or more hardware processors to execute the computer-executable instructions to:
determine a first plurality of interactions, wherein each interaction of the first plurality of interactions is associated with a first corresponding set of characteristics, and wherein each characteristic of the first corresponding set of characteristics includes a respective first characteristic type and a respective first characteristic value;
determine, based on the first plurality of interactions, a first subset of the first plurality of interactions associated with one or more first characteristic values that occur at a first frequency that is greater than a first threshold frequency;
based on the one or more first characteristic values occurring at the first frequency that is greater than the first threshold frequency, determine a first set of characteristic types associated with the one or more first characteristic values of the first subset of the first plurality of interactions;
determine a second plurality of interactions, wherein each interaction of the second plurality of interactions is associated with a second corresponding set of characteristics, and wherein each characteristic of the second corresponding set of characteristics includes a respective second characteristic type and a respective second characteristic value;
determine, for a second subset of the second plurality of interactions, one or more second characteristic values that occur at a second frequency greater than one or more of the first threshold frequency or a second threshold frequency and that correspond to the first set of characteristic types;
determine that output has not been determined using the first set of characteristic types within at least a threshold length of time; and
based on the one or more second characteristic values occurring at the second frequency greater than the one or more of the first threshold frequency or the second threshold frequency, and based on determining that output has not been determined using the first set of characteristic types within at least the threshold length of time, generate an output based on the second subset of the second plurality of interactions.

2. The system of claim 1, wherein the first plurality of interactions is associated with a first time period, and the second plurality of interactions is associated with a second time period that occurs after the first time period.

3. The system of claim 1, wherein the one or more first characteristic values are associated with an indication of an anomalous interaction, and wherein the first set of characteristic types is further determined based on the one or more first characteristic values being associated with the indication.

4. The system of claim 1, wherein the one or more second characteristic values differ from the one or more first characteristic values.

5. The system of claim 1, further comprising computer-executable instructions to:
determine a frequency of occurrence of at least one value of the one or more second characteristic values in one or more of the first plurality of interactions or the second plurality of interactions; and
determine a risk value associated with the second subset of the second plurality of interactions based on the frequency of occurrence, wherein the risk value indicates a risk that is inversely related to the frequency of occurrence;
wherein the output is further based on the risk value.

6. The system of claim 1, further comprising computer-executable instructions to:
receive feedback data in response to the output, wherein the feedback data includes an indication of one or more of an anomalous interaction or a non-anomalous interaction associated with the second subset of the second plurality of interactions;
determine training data based on one or more of the feedback data or the output; and
train the system to determine one or more of interactions or characteristic types using the training data.

7. The system of claim 1, further comprising computer-executable instructions to:
determine, based on the first plurality of interactions, a third subset of the first plurality of interactions associated with one or more third characteristic values that one or more of: occur at a third frequency that is greater than the first threshold frequency or are associated with an indication of an anomalous interaction;
determine a second set of characteristic types associated with the one or more third characteristic values; and
determine that the first subset of the first plurality of interactions is associated with a first selected type of anomalous interaction;
wherein the one or more second characteristic values that correspond to the first set of characteristic types is determined based on the first plurality of interactions being associated with the first selected type of anomalous interaction, and the output is indicative of the first selected type of anomalous interaction.

8. The system of claim 7, further comprising computer-executable instructions to:
receive input indicative of a second selected type of anomalous interaction;
determine that the third subset of the first plurality of interactions is associated with the second selected type of anomalous interaction; and
determine, for a fourth subset of the second plurality of interactions, one or more fourth characteristic values that correspond to the second set of characteristic types;
wherein the output is further based on the fourth subset of the second plurality of interactions and is indicative of the second selected type of anomalous interaction.

9. The system of claim 1, further comprising computer-executable instructions to:
determine, based on the first plurality of interactions, a third subset of the first plurality of interactions associated with one or more third characteristic values that one or more of: occur at a third frequency that is greater than the first threshold frequency or are associated with an indication of an anomalous interaction;
determine a second set of characteristic types associated with the one or more third characteristic values;
determine, based on the first plurality of interactions, a fourth subset of the first plurality of interactions associated with one or more fourth characteristic values that one or more of: occur at a fourth frequency that is greater than the first threshold frequency or are associated with the indication of an anomalous interaction;

determine a third set of characteristic types associated with the one or more fourth characteristic values;

determine a first portion of a selected type of anomalous interaction associated with the first subset of the first plurality of interactions;

determine a second portion of the selected type of anomalous interaction associated with the third subset of the first plurality of interactions;

determine a third portion of the selected type of anomalous interaction associated with the fourth subset of the first plurality of interactions;

determine that the second portion and the third portion are smaller than the first portion, wherein the one or more second characteristic values that correspond to the first set of characteristic types is determined based on the second portion and the third portion being smaller than the first portion;

determine that the second portion is larger than the third portion; and determine, for a fifth subset of the second plurality of interactions, one or more fifth characteristic values that correspond to the second set of characteristic types;

wherein the output is further based on the fifth subset of the second plurality of interactions.

10. The system of claim 1, further comprising computer-executable instructions to:

determine a time series that represents occurrence of the one or more first characteristic values in the first plurality of interactions over a length of time; and determine the first threshold frequency based on the time series.

11. A system comprising:

one or more non-transitory memories storing computer-executable instructions; and one or more hardware processors to execute the computer-executable instructions to:

determine, based on a first plurality of interactions, one or more first characteristic values that occur at a first frequency that differs from a first threshold frequency by at least a first threshold value;

based on the one or more first characteristic values occurring at the first frequency that differs from the first threshold frequency by at least the first threshold value, determine a first set of characteristic types associated with the one or more first characteristic values;

determine, based on a second plurality of interactions and the first set of characteristic types, a subset of the second plurality of interactions having one or more second characteristic values that correspond to the first set of characteristic types and that occur at a second frequency that differs from one or more of the first threshold frequency or a second threshold frequency;

determine that output has not been determined using the first set of characteristic types within at least a threshold length of time; and based on the one or more second characteristic values occurring at the second frequency that differs from the one or more of the first threshold frequency or the second threshold frequency, and based on determining that output has not been determined using the first set of characteristic types within at least the threshold length of time, determine an output based on the subset of the second plurality of interactions.

12. The system of claim 11, wherein the one or more second characteristic values differ from the one or more first characteristic values of the first plurality of interactions.

13. The system of claim 11, further comprising computer-executable instructions to:

determine a frequency of occurrence of at least one value of the one or more second characteristic values in one or more of the first plurality of interactions or the second plurality of interactions;

wherein the output is further based in part on the frequency of occurrence.

14. The system of claim 11, wherein the first set of characteristic types includes one or more of: a hardware component of a device, a software component of the device, a network used to exchange data with the device, a network address associated with the device, an indication of a geographic location associated with one or more of user input or a user account, an e-mail address associated with the one or more of the user input or the user account, or an identifier associated with the one or more of the user input or the user account.

15. The system of claim 11, further comprising computer-executable instructions to:

determine, based on the first plurality of interactions, one or more third characteristic values that occur at a third frequency greater than one or more of the first threshold frequency or a third threshold frequency;

determine a second set of characteristic types associated with the one or more third characteristic values;

receive input indicative of a type of anomalous interaction;

determine that the one or more first characteristic values are associated with a first portion of the type of anomalous interaction within the first plurality of interactions; and determine that the one or more third characteristic values are associated with a second portion of the type of anomalous interaction within the first plurality of interactions, wherein the second portion is smaller than the first portion;

wherein the subset of the second plurality of interactions having the one or more second characteristic values that correspond to the first set of characteristic types is determined based on the one or more first characteristic values being associated with the first portion of the type of anomalous interaction within the first plurality of interactions.

16. The system of claim 11, further comprising computer-executable instructions to:

determine a time series that represents occurrence of the one or more second characteristic values in the second plurality of interactions over a length of time; and determine the second threshold frequency based on the time series.

17. A system comprising:

one or more non-transitory memories storing computer-executable instructions; and one or more hardware processors to execute the computer-executable instructions to:

determine, based on a first plurality of interactions, one or more first characteristic values that occur at a first frequency that differs from a first threshold frequency by at least a first threshold value;

based on the one or more first characteristic values occurring at the first frequency that differs from the first threshold frequency by at least the first threshold value, determine a first set of characteristic types associated with the one or more first characteristic values;

determine, based on the first plurality of interactions, one or more second characteristic values that occur at a second frequency greater than one or more of the first threshold frequency or a second threshold frequency;

determine a second set of characteristic types associated with the one or more second characteristic values;

receive input indicative of a type of anomalous interaction;

determine that the one or more first characteristic values are associated with a first portion of the type of anomalous interaction within the first plurality of interactions;

determine that the one or more second characteristic values are associated with a second portion of the type of anomalous interaction within the first plurality of interactions, wherein the second portion is smaller than the first portion;

based on the one or more first characteristic values being associated with the first portion of the type of anomalous interaction within the first plurality of interactions, determine, based on a second plurality of interactions and the first set of characteristic types, a subset of the second plurality of interactions having one or more third characteristic values that correspond to the first set of characteristic types and that occur at a third frequency that differs from one or more of the first threshold frequency or a third threshold frequency;

determine that output has not been determined using the first set of characteristic types within at least a threshold length of time; and based on the one or more third characteristic values occurring at the third frequency that differs from the one or more of the first threshold frequency or the third threshold frequency, and based on determining that output has not been determined using the first set of characteristic types within at least the threshold length of time, determine output based on the subset of the second plurality of interactions.

18. The system of claim 17, further comprising computer-executable instructions to: determine a time series that represents occurrence of the one or more first characteristic values in the first plurality of interactions over a length of time; and determine the first threshold frequency based on the time series.

19. The system of claim 17, wherein the one or more third characteristic values differ from the one or more first characteristic values of the first plurality of interactions.

20. The system of claim 17, wherein the first set of characteristic types includes one or more of: a hardware component of a device, a software component of the device, a network used to exchange data with the device, a network address associated with the device, an indication of a geographic location associated with one or more of user input or a user account, an e-mail address associated with the one or more of the user input or the user account, or an identifier associated with the one or more of the user input or the user account.

* * * * *